US009924558B2

(12) United States Patent
Engelien-Lopes et al.

(10) Patent No.: US 9,924,558 B2
(45) Date of Patent: Mar. 20, 2018

(54) DIGITAL RADIO COMMUNICATION

(71) Applicant: NORDIC SEMICONDUCTOR ASA, Trondheim (NO)

(72) Inventors: David Alexandre Engelien-Lopes, Malvik (NO); Sverre Wichlund, Trondheim (NO); Phil Corbishley, Chilton (GB)

(73) Assignee: NORDIC SEMICONDUCTOR ASA, Trondheim (NO)

( * ) Notice: Subject to any disclaimer, the term of this patent is extended or adjusted under 35 U.S.C. 154(b) by 136 days.

(21) Appl. No.: 14/896,367

(22) PCT Filed: Jun. 4, 2014

(86) PCT No.: PCT/GB2014/051719
§ 371 (c)(1),
(2) Date: Dec. 4, 2015

(87) PCT Pub. No.: WO2014/195696
PCT Pub. Date: Dec. 11, 2014

(65) Prior Publication Data
US 2016/0128126 A1    May 5, 2016

(30) Foreign Application Priority Data

Jun. 5, 2013   (GB) .................................. 1310026.8

(51) Int. Cl.
*H04W 76/02*    (2009.01)
*H04L 1/00*    (2006.01)
(Continued)

(52) U.S. Cl.
CPC ......... *H04W 76/028* (2013.01); *H04L 1/0009* (2013.01); *H04L 1/0023* (2013.01); *H04L 1/08* (2013.01); *H04W 4/008* (2013.01)

(58) Field of Classification Search
None
See application file for complete search history.

(56) References Cited

U.S. PATENT DOCUMENTS

2002/0003792 A1*   1/2002   Schmidl ............... H04L 1/0026
                                                                370/343
2003/0043930 A1*   3/2003   Morris .................. H04L 1/0009
                                                                375/285
(Continued)

FOREIGN PATENT DOCUMENTS

EP           1041771 A1      10/2000
GB           2350027 A        5/1999
WO       WO 2013/029628 A1    1/2008

OTHER PUBLICATIONS

Notification of Transmittal of the International Search Report and the Written Opinion of the International Searching Authority (PCT/ISA/220; PCT/ISA/210; PCT/ISA/237) for PCT/GB2014/051719 dated Aug. 1, 2014.
Valenti M C et al: 11 Custom coding. adaptive rate control. and distributed detection for bluetooth 11 VTC 2002-Fall. 2002 IEEE 56th. Vehicular Technology Conference Proceedings. Vancouver. Canada. Sep. 24-28, 2002; [IEEE Vehicular Technology Conference]. New York. NY : IEEE. US. vol. 2. Sep. 24, 2002 (Sep. 24, 2002). pp. 918-922. XP010608947. DOI: 10.1109/VETECF.2002. 1040734 ISBN: 978-0-7803-7467-6 Sections I.III.IV.
(Continued)

*Primary Examiner* — Kodzovi Acolatse
(74) *Attorney, Agent, or Firm* — Koppel, Patrick, Heybl & Philpott

(57) ABSTRACT

A method of digital radio communication between a first device (2) and a second device (8), where each device comprises a radio transmitter (4, 10) and a radio receiver (6, 12), the method comprising: a) said first and second devices (2, 8) establishing a connection using a predetermined protocol having at least one predefined message format; and b) said first and second devices (2, 8) agreeing that in the event of said connection being broken a re-connection may be established using a coding scheme in which at least some bits specified in said predefined message format are represented by a plurality of bits transmitted.

41 Claims, 5 Drawing Sheets

(51) Int. Cl.
*H04L 1/08* (2006.01)
*H04W 4/00* (2018.01)

(56) References Cited

U.S. PATENT DOCUMENTS

| | | |
|---|---|---|
| 2005/0071714 A1 | 3/2005 | Soga et al. |
| 2008/0002761 A1 | 1/2008 | Edsall et al. |
| 2011/0237191 A1* | 9/2011 | Saito .................. H04W 76/064 455/41.2 |
| 2013/0005260 A1* | 1/2013 | Hosono ............... H04M 1/6091 455/41.2 |
| 2014/0185579 A1* | 7/2014 | Popovski .............. H04W 28/22 370/329 |

OTHER PUBLICATIONS

El-Bendary M A M et al: 11 Bluetooth performance improvement over different channels through channel coding. Systems. Signals and Devices. 2008. IEEE SSD 2008. 5th Nternational Multi-Conference on. IEEE. Piscataway. NJ.USA. Jul. 20, 2008 (Jul. 20, 2008). pp. 1-5. XP031395767.ISBN: 978-1-4244-2205-0 Sections 1-4.
UK Intellectual Property Office Search Report for GB1310026.8 dated Dec. 2, 2013.
International Preliminary Report on Patentability and Written Opinion from Appl. No. PCT/GB2014/051719, dated Dec. 8, 2015.

* cited by examiner

DIGITAL RADIO COMMUNICATION

This application relates to short range radio communication. It relates particularly, although not exclusively, to ad hoc short range radio communication protocols such as Bluetooth™, or the more recent Bluetooth Low Energy™ protocol.

The Bluetooth Low Energy (BLE) core specification version 4.0 specifies a fixed data rate of 1 MBps as well as a maximum transmitter output power of 10 mW and a minimum receiver sensitivity of −70 dB at a bit error rate (BER) of 0.1%. The combined effect of these is that there is a maximum effective range between which BLE-enabled devices can communicate. The actual range which can be achieved is dependent on environmental factors such as noise and obstacles but may be of the order of 10-100 meters.

When viewed from a first aspect the invention provides a method of digital radio communication between a first device and a second device, each comprising a radio transmitter and a radio receiver, the method comprising:

a) said first and second devices establishing a connection using a predetermined protocol having at least one predefined message format; and b) said first and second devices agreeing that in the event of said connection being broken a re-connection may be established using a coding scheme in which at least some bits specified in said predefined message format are represented by a plurality of bits transmitted.

The invention extends to a digital radio communication system comprising a first device and a second device, each comprising a radio transmitter and a radio receiver, wherein:

a) said first and second devices are arranged to establish a connection using a predetermined protocol having at least one predefined message format; and b) said first and second devices are arranged to agree that in the event of said connection being broken a re-connection may be established using a coding scheme in which at least some bits specified in said predefined message format are represented by a plurality of bits transmitted.

The invention extends further to a first digital radio device comprising a radio transmitter and a radio receiver, the device being arranged:

a) to establish a connection with a second digital radio device using a predetermined protocol having at least one predefined message format; and b) to agree with said second device that in the event of said connection being broken a re-connection may be established using a coding scheme in which at least some bits specified in said predefined message format are represented by a plurality of bits transmitted.

Thus it will be seen by those skilled in the art that in accordance with the invention two devices operating a predetermined protocol can agree to apply a coding scheme in which bits are represented by multiple transmitted bits. The advantage of this is that it is easier to recover the represented bit even if some of the actual bits transmitted are not received or recovered reliably. This means that a BER specified in the protocol can be achieved for represented bits whilst the BER for transmitted bits (referred to hereinafter as "chips") is much higher. In practical terms this means that for a given transmission power and receiver gain, a connection that is otherwise in accordance with the protocol may extend over a greater distance than without the coding scheme being applied. Such operation can therefore be considered a long range mode of the protocol.

By agreeing, in accordance with embodiments of the present invention, during an initial connection that the coding scheme is to be applied for any necessary reconnection, makes it possible for the two devices to reconnect if they are too far apart to establish a conventional connection under the protocol.

In the context of Bluetooth Low Energy, the arrangements described above represent an extension to the core specification which support the introduction of a long range mode. This has the potential to extend the usefulness of BLE.

As will be appreciated by those skilled in the art representing each data bit by a plurality of chips reduces the effective data rate which can be achieved. More specifically where each data bit is represented by a fixed length sequence, the effective data rate is the chip rate divided by the sequence length. There is thus a trade-off between sequence length and data rate. On the other hand the longer the sequence used, the greater the range which can be achieved for a given data BER as longer sequences give greater tolerance to dropped chips. The increase in ability to receive data to which coding sequence has been applied is referred to as coding gain. There is thus a direct positive relationship between sequence length and the degree of coding gain.

In a set of embodiments the first device comprises a master device and the second device comprises a slave device. The method of the invention extends to the first and second devices establishing a re-connection using said coding scheme, The coding scheme could take one of a number of different forms. In a set of embodiments it may, for example, comprise simply repeating each bit in a message or part of a message a specified number of times. It may comprise repeating a string forming part of a message a specified number of times. In a set of preferred embodiments a respective fixed sequence of chips is used to represent each data bit, which may be known as direct sequence spread spectrum (DSSS) coding. Any combination of the above approaches (and others) could also be used.

The coding scheme employed could be predetermined. Alternatively in a set of embodiments the coding scheme is agreed between the two devices during a connection or during the establishment of a connection. For example it could be part of the information exchanged in a Bonding procedure for devices operating in accordance with the Bluetooth™ or Bluetooth Low Energy™ protocols. The devices could agree to adopt one of a number of possible predetermined schemes or one device could provide information relating to the coding scheme to be applied to the other device. This information may comprise the type of scheme (e.g. repeated bits, repeated strings, DSSS etc) and/or the sequence length (and thus the coding gain).

During a connection or establishment of a connection between the first and second devices they may agree to adopt the coding scheme in the event of a reconnection being necessary. This may result simply whenever the first and second device both support applying a coding scheme to reconnections. Alternatively it may be agreed only if another criterion is met—e.g. of it is necessary to apply the coding scheme during the connection itself.

The first and second devices may reach an agreement to employ the coding scheme in a number of ways. In a set of embodiments the devices may agree to apply the coding scheme during a negotiation phase after an initial pairing. This could be achieved by one of the first and second devices setting a flag or other field in a message in a predefined message format, indicating that the device supports the coding scheme. The other device may send an acknowledgement that it, too supports the coding scheme.

In a preferred set of embodiments the coding scheme is agreed during a Bonding phase after a Pairing phase in accordance with the Bluetooth or Bluetooth Low Energy specification core specification v4.0.

When a connection between the first device and the second device is broken, one or both of the devices may attempt to establish a re-connection. One or both devices may be arranged to transmit messages indicating a desire to re-connect, e.g. one or both of the devices may go into the Advertising state defined in the Bluetooth core specification v4.0. For example where there is a slave device it may be arranged to go into the Advertising state. The other device may be arranged to listen for messages indicating a desire to establish a re-connection, e.g. one or both of the of the devices may go into the Scanning state defined in the Bluetooth core specification v4.0. For example where there is a master device it may be arranged to go into the Scanning state.

In the set of embodiments where one of the devices, e.g. the slave device, is arranged to transmit a message indicating a desire to reconnect, preferably said message is at least partly encoded according to the coding scheme. Similarly the other device, e.g. the master device, is preferably arranged to listen for a message at least partly encoded using said coding scheme.

Such an arrangement is believed to be novel and inventive in its own right and thus when viewed from a second aspect the invention provides a method of digital radio communication between a first device and a second device, each comprising a radio transmitter and a radio receiver, the method comprising:

a) said first and second devices establishing a connection using a predetermined protocol; and b) if said connection is broken, one of said first and second devices transmitting an advertising message having a predefined message format indicating a desire to establish a re-connection wherein said advertising message is at least partly encoded using a coding scheme in which at least some bits specified in said predefined message format are represented by a plurality of bits transmitted.

The second aspect of the invention extends to a digital radio communication system comprising a first device and a second device, each comprising a radio transmitter and a radio receiver, wherein:

a) said first and second devices are arranged to establish a connection using a predetermined protocol; and b) if said connection is broken, one of said first and second devices is arranged to transmit an advertising message having a predefined message format indicating a desire to establish a re-connection wherein said advertising message is at least partly encoded using a coding scheme in which at least some bits specified in said predefined message format are represented by a plurality of bits transmitted.

The second aspect of the invention extends further to a digital radio device comprising a radio transmitter and a radio receiver, the device being arranged:

a) to establish a connection with another digital radio device using a predetermined protocol; and b) if said connection is broken, to transmit an advertising message having a predefined message format indicating a desire to establish a re-connection wherein said advertising message is at least partly encoded using a coding scheme in which at least some bits specified in said predefined message format are represented by a plurality of bits transmitted.

Thus in embodiments or aspects of the invention the coding scheme is used at least for establishing a re-connection between the first and second devices. For example the coding scheme may be used for a reconnection advertisement packet, for example a Bluetooth Advertisement packet.

Additionally or alternatively the coding scheme may be used for subsequent communication packets after the re-connection has been established. The coding scheme could be used for all subsequent communication between the first and second device for the duration of the re-connection. In a set of preferred embodiments however the coding scheme can be changed if a criterion is met. The coding scheme may be changed by simply discontinuing it—i.e. no longer applying any coding—or by applying a different coding scheme—e.g. one with a different coding gain.

The criterion used to determine whether to change the coding scheme could comprise a measure of the quality of signal between the two devices. This might include, for example, a threshold bit error rate or estimate of noise or interference. Alternatively it could comprise an estimate of the separation of the devices. In a set of preferred embodiments the criterion comprises an estimate of the received signal strength from the other device. Thus in a set of embodiments the coding scheme is changed if the received signal strength of one device is determined to be above or below a threshold level. The first and second devices may each be arranged to determine the signal strength received from the other to determine whether to change the predetermined coding scheme; or only one of them may be arranged to do this—e.g. the master device.

Arrangements set out above may allow, for example, a reduced coding gain (and so an increased potential data rate) to be applied if the received signal strength is high and vice versa.

In a set of embodiments of either aspect of the invention, the predetermined protocol is compatible with the Bluetooth™ protocol as issued by the Bluetooth Special Interest Group, e.g. as defined in the Bluetooth Low Energy core specification v4.0. For example the protocol may be a modification of the Bluetooth Low Energy core specification v4.0 to accommodate, inter alia, the features described herein.

Certain embodiments of the invention will now be described, by way of example only, with reference to the accompanying drawings in which.

Figure 1:
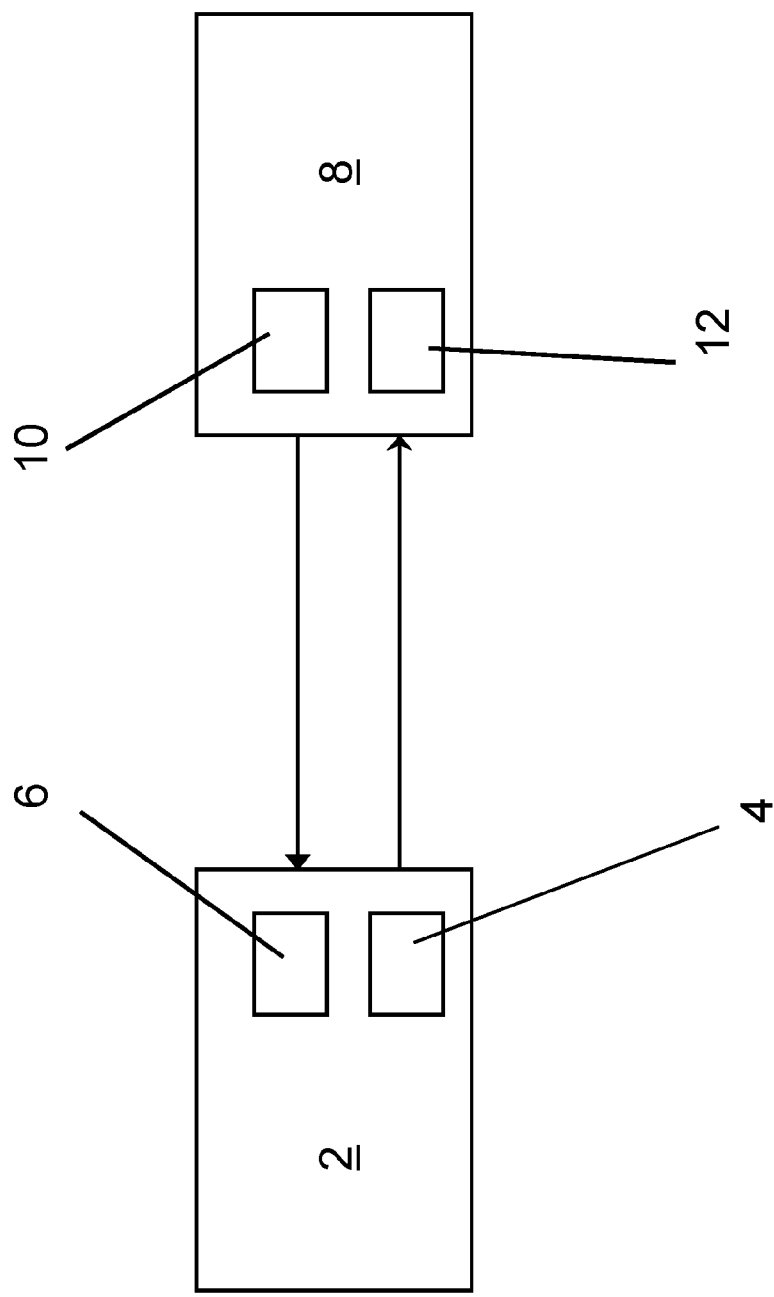
FIG. 1 is a generalised illustration showing a first and second device communicating with one another.

FIG. 1 shows a master device 2 (also known as a Central device) having a radio transmitter section 4 and a radio receiver section 6; and a slave device 8 (also known as a Peripheral device) also having a radio transmitter section 10 and a radio receiver section 12. Apart from where specified to the contrary hereinbelow the Master and Slave devices 2, 8 are configured to operate according to the Bluetooth Low Energy (BTLE) core specification version 4.0.

Figure 2:
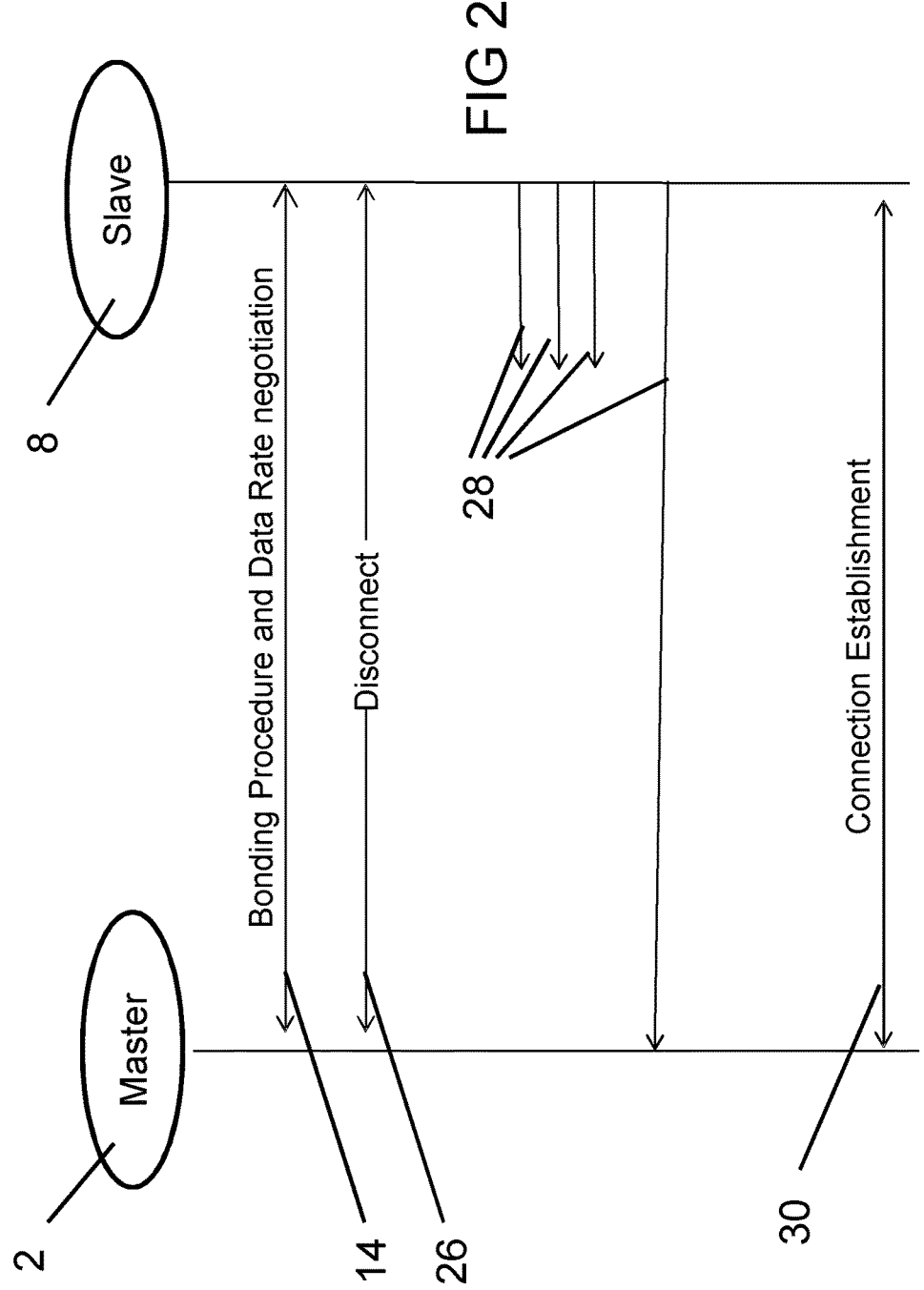
FIG. 2 is a schematic illustration of the procedure followed by the devices in accordance with an embodiment of the invention.

FIG. 2 gives a broad overview of the operation of embodiment described herein. In the first step 14 the master 2 and slave 8 undergo a conventional Bonding procedure which is described below with reference to FIG. 3. The procedure commences with the master 2 setting the Bonding_Flags to Bonding. It is assumed that the slave 8 is also in Bonding mode.

Figure 3:
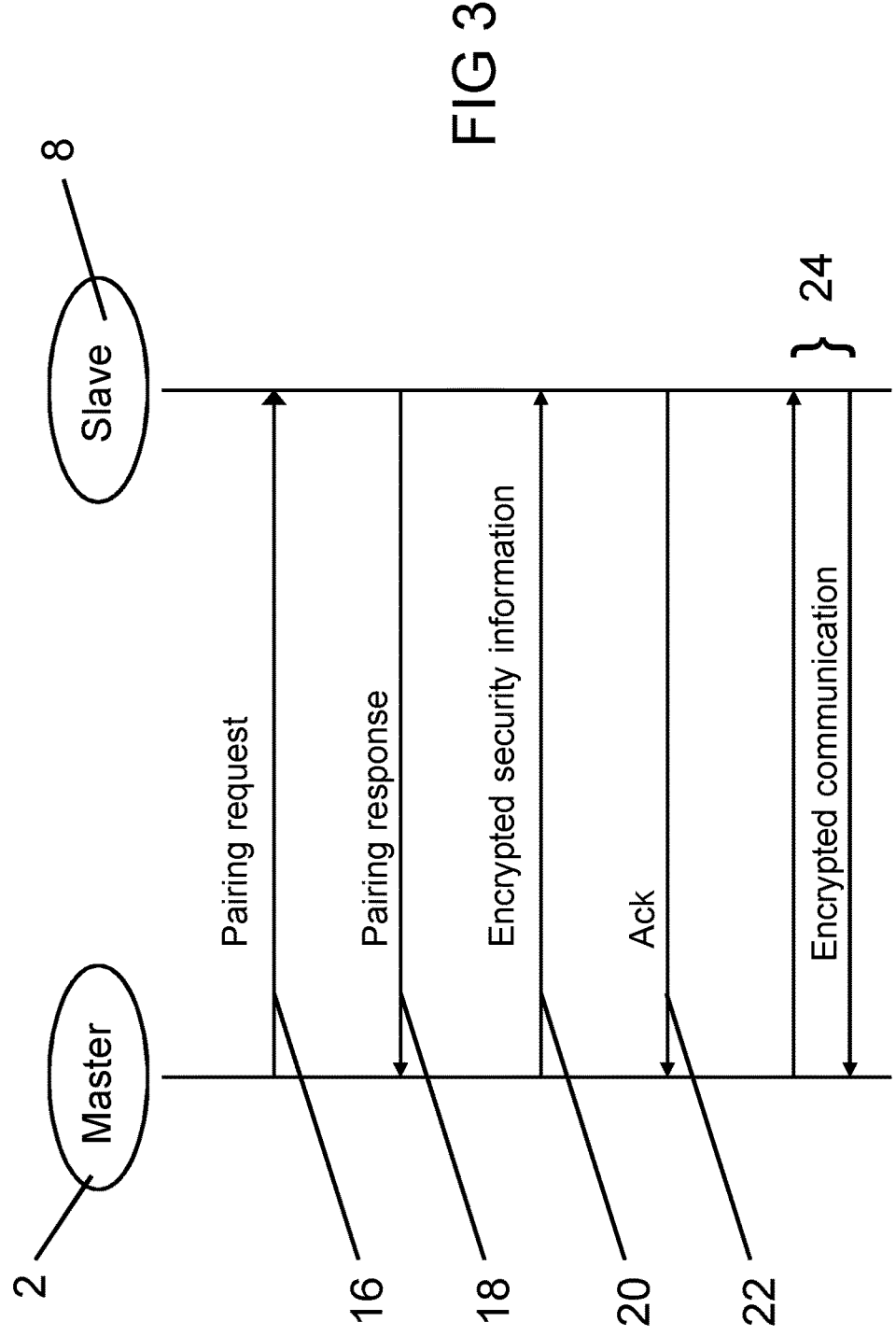
FIG. 3 is a more detailed schematic illustration of the Bonding process.

With reference to FIG. 3, the master device 2 sends a Pairing request 16 to the slave device 8 comprising various capability and security information including, for example, input/output (IO) capability and a Short Term Key (STK) which is used for encrypting the transmissions during the negotiation process. The slave device 8 issues a Pairing response 18 indicating its compatibility with the capabilities specified by the master device 2. This comprises phase one of a standard Pairing operation.

In phase 2 of the Pairing operation data can be exchanged between the two devices using the STK. The paired connection between the two devices 2, 8 at this point is a one-off one so that if the connection were to be broken it would be necessary to repeat the procedure anew.

In a further round of communication representing phase three in which the Pairing connection is transformed to a Bonding connection, the master device 2 sends further identity and security information 20, encrypted using the STK. The further information includes a Long Term Key (LTK) to use for encryption of subsequent communication between the master and the slave. More significantly the additional information includes an indication that the master device 2 supports a Long Range mode. This could, for example, include a specification of a data rate or coding gain to be applied between the devices when attempting to establish a re-connection if the connection between them is broken. This information is stored in a memory by both the master 2 and slave 8 so that they 'recognise' one another if subsequently re-connecting.

In one possible example the Master could specify a coding gain of say 6 dB which corresponds to a data rate of 25% of the original value—i.e. 250 kBps in a Bluetooth Low Energy system. This can be achieved by representing each bit of the packet, or part-packet, to which the coding gain is applied by four chips, i.e. using a sequence length of four. This may be seen in greater detail with reference to FIG. 5 described below.

The slave device 8 then sends an acknowledgement 22 back to the master device 2 confirming that it can support the requested coding gain. If the slave device is unable to support the requested coding gain the acknowledgement message 22 may include a proposed alternative coding gain.

Thereafter at step 24 the master and slave devices 2, 8 may communicate with one another at the standard 1 MBps data rate, encrypted using the LTK. they may communicate at the lower data rate agreed for re-establishing connection Alternatively—e.g. 250 kbps. This could be determined by the master measuring the signal strength it receives from the slave and determining this to be below a predetermined threshold as explained below with reference to FIG. 4.

Returning to FIG. 2 it is now assumed that at a later point the connection between the master 2 and slave 8 is broken at step 26—e.g. because one of the devices does not receive an expected message within a specified time-out period. The slave device 8 transmits Advertisement packets 28 to the master device 2 seeking to establish a re-connection. However rather than the Advertisement packet being transmitted at the standard 1 MBps data rate, part of it is transmitted at a lower data rate to give a coding gain, as previously agreed during phase three of the Bonding process.

The Master device 2 receives one of the Advertisement packets 28 and because of the prior negotiation and agreement of data rate during the Bonding process, it applies the correct coding sequence to its demodulator to extract packets containing the correct address and data rate. If it had not applied the correct data rate the packet would have been automatically rejected. As a result of the coding gain/reduced data rate applied to the Advertisement packet 28, the master 2 has a greater opportunity to receive it reliably at a greater distance than if a standard data rate packet had been transmitted.

A further connection 30 is then established to allow continued communication between the master 2 and slave 8. This communication initially takes place at the lower data rate used for the Advertisement packet since the coding gain is applied to the packets exchanged. However if the mater device 2 detects a received signal strength from the slave device above a threshold, a criterion is met for reducing the coding gain using the protocol illustrated in FIG. 4.

Figure 4:
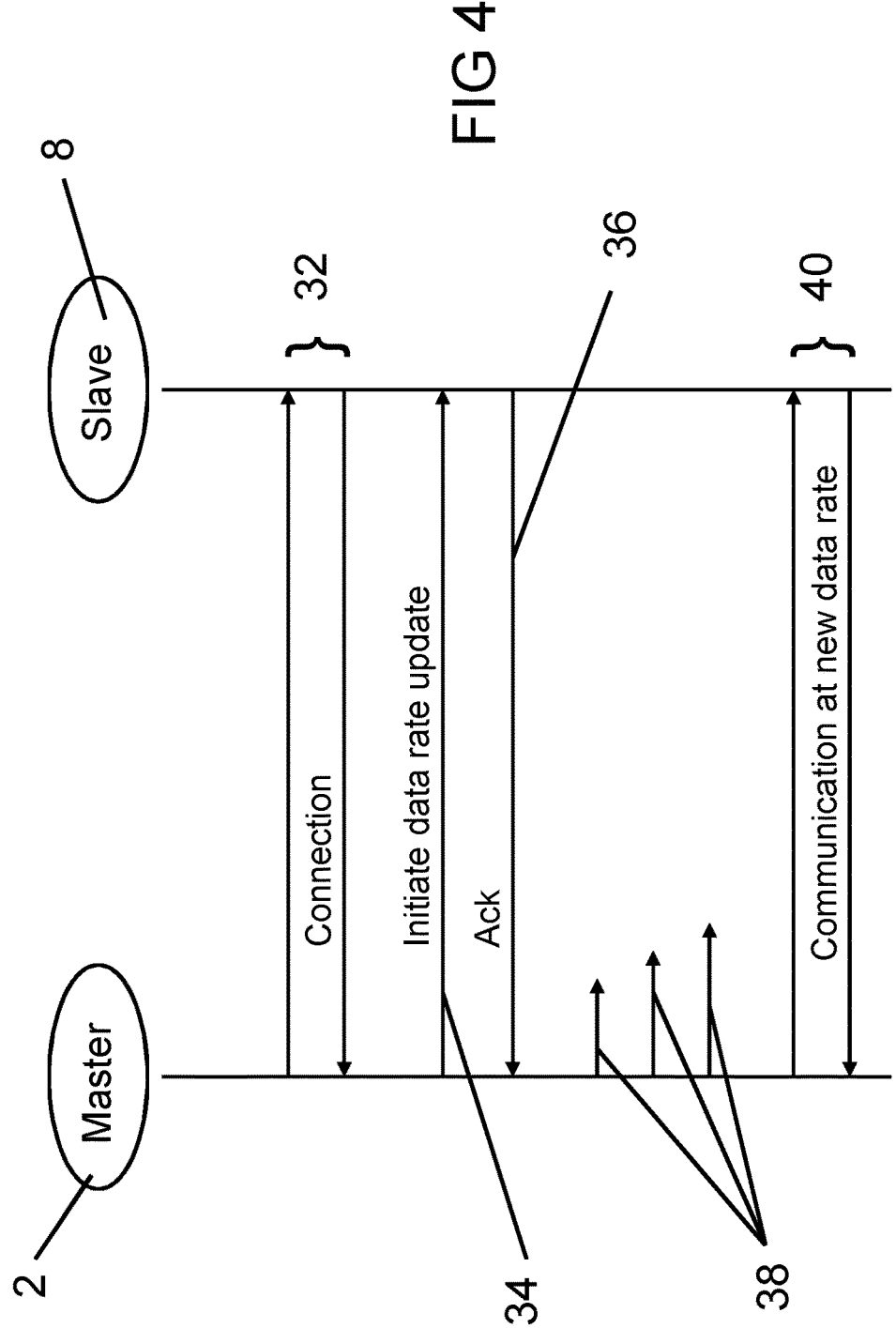
FIG. 4 is a schematic illustration of a process to change the data rate during a connection.

As shown in FIG. 4 the master 2 and slave 8 begin in a connected state 32. Following a regular check carried out by the master 2, it determines that the received signal strength of the signal from the slave 8 is above a threshold, typically because the distance between the master and slave devices has been reduced. In order to take advantage of the increased signal strength, the master 2 sends a special packet 34 to initiate an increase of the data rate. The packet 34 includes a field which specifies the new data rate to be applied. For example it may specify a shorter sequence length corresponding to a lower coding gain and so a higher data rate. The master 2 will be aware of which data rates the slave 8 can support from the exchange of capability information during the third phase of the Bonding procedure previously carried out and thus further negotiation is not necessary. The packet 34 may initiate a control procedure or could simply prompt a data rate change from the next packet or the next event.

After a certain number of events 38 (which number may be specified in the initiating packet 34) the master 2 and slave 8 begin at step 40 to communicate at the new data rate. This means that the devices each apply the new sequence length to all or part of their transmitted packets and configure their receive demodulators to be responsive to the new sequence length for received packets.

The procedure set out above may be repeated any number of times during the connection—either to further relax the coding gain if the signal strength continues to increase or to increase it again if the devices move apart and the signal strength drops.

Although the procedure described above is based on received signal strength, this is not essential. It could, for example, be based on a threshold bit error rate or other parameter related to the separation of the devices or the quality of the connection.

Figure 5:
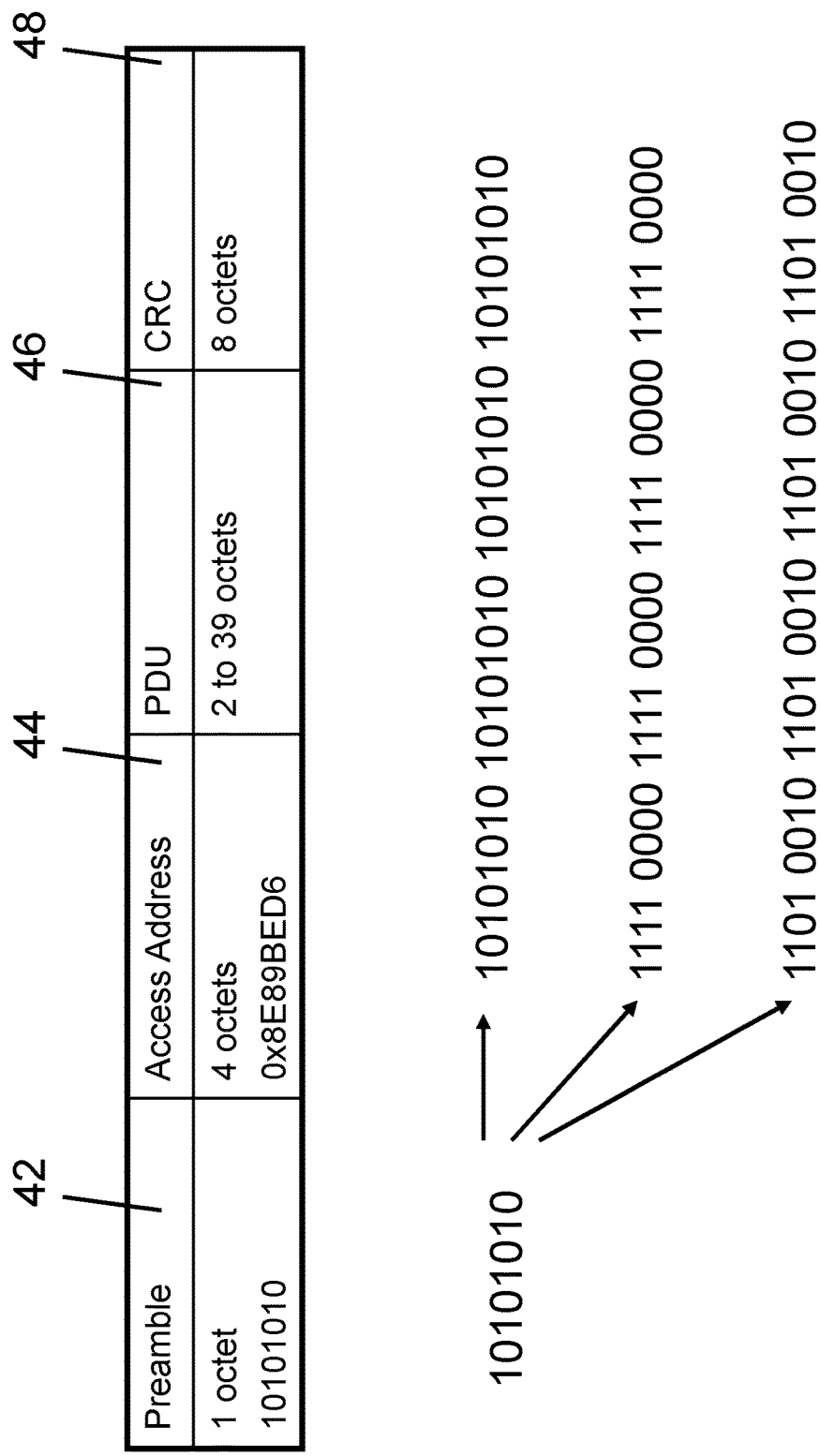
FIG. 5 is a representation of a packet structure and possible coding schemes which may be applied.

FIG. 5 shows a typical packet construction. The packet is divided into four separate fields of differing lengths. The first is the Preamble 42. This is made up of a single octet of alternating bits which may be used by the receiver for frequency recovery, timing recovery etc. Below the table are some examples of how a four times coding gain could be applied to the preamble '10101010'. In the top example the original sequence is simply repeated four times. Thus a bit at position n in the original string is represented by four bits (or 'chips') in the extended sequence—namely those at positions n, n+8, n+16 and n+24 of the extended string.

In the centre example each bit is repeated four times. Again, clearly each bit in the original string is represented by four chips in the extended string.

In the bottom example a direct-sequence spread spectrum is used. In this example each '1' bit is represented by the sequence '1101' and each ')' bit is represented by '0010'. Of course different sequences could be used, particularly different length sequences could be used depending on the required coding gain. The actual sequence to be used for each bit could be agreed during phase three of the Bonding process.

Although the preamble is used in FIG. 5 as a simple example of how coding gain might be applied, in an exemplary embodiment no coding gain is applied to the preamble in order that it can still be used for initialisation at the receiver.

The fields in the packet are the Access Address 44 which specifies the address of the device to which the packet is directed, the Protocol Data Unit (PDU) 46 which is the actual content of the message carried by the packet and the Cyclic Redundancy Check (CRC) 48 which is a field generated by a predetermined formula from the PDU 46 for use in error checking.

In an example implementation the Access Address 44, PDU 46 and CRC 48 are all encoded using DSSS. The CRC 38 is calculated from the PDU 46 before the DSSS coding is applied.

The invention claimed is:

1. A method of digital radio communication between a first device and a second device, each comprising a radio transmitter and a radio receiver, the method comprising:
 a) said first and second devices establishing a connection using a predetermined protocol having at least one predefined message format; and
 b) said first and second devices agreeing that in the event of said connection being broken a re-connection may be established using a coding scheme in which at least some bits specified in said predefined message format are represented by a plurality of bits transmitted;
 wherein said coding scheme comprises a respective fixed sequence of chips to represent each data bit; and
 the method further comprises the first and second devices agreeing said coding scheme during the connection or during establishment of the connection;
 said first device sending a message comprising capability information and information indicating coding gain or data rate to apply when attempting to re-establish communication; and
 said second device sending an acknowledgment to said first device confirming that said second device can support the requested coding gain or data rate.

2. A method as claimed in claim 1 wherein the first device comprises a master device and the second device comprises a slave device.

3. A method as claimed in claim 1 comprising the first and second devices agreeing to apply the coding scheme during a negotiation phase after an initial pairing.

4. A method as claimed in claim 1 comprising the first and second devices agreeing to apply the coding scheme during a Bonding phase after a Pairing phase in accordance with a Bluetooth™ or Bluetooth Low Energy™ specification.

5. A method as claimed in claim 1 comprising at least one of said first and second devices transmitting a message indicating a desire to re-connect if said connection is broken.

6. A method as claimed in claim 5 wherein said message is at least partly encoded according to the coding scheme.

7. A method as claimed in claim 5 wherein the other of said first or second devices is arranged to listen for a message at least partly encoded using said coding scheme if said connection is broken.

8. A method as claimed in claim 1 comprising the first and second devices establishing a re-connection using said coding scheme.

9. A method as claimed in claim 8 comprising using the coding scheme for subsequent communication packets after the re-connection has been established.

10. A method as claimed in claim 9 comprising changing the coding scheme if the received signal strength of one device is determined to be above or below a threshold level.

11. A method as claimed in claim 8 comprising changing the coding scheme if a criterion is met.

12. A method as claimed in claim 11 wherein said criterion comprises a measure of a quality of signal between the first and second devices.

13. A method as claimed in claim 11 wherein said criterion comprises an estimate of the received signal strength from one of the devices to the other device.

14. A method as claimed in claim 1 wherein the predetermined protocol is compatible with a Bluetooth™ or Bluetooth Low Energy™ protocol.

15. A first digital radio device comprising a radio transmitter and a radio receiver, the device being arranged:
 a) to establish, using said radio transmitter and radio receiver, a connection with a second digital radio device using a predetermined protocol having at least one predefined message format; and
 b) to agree, using said radio transmitter and radio receiver with said second device that in the event of said connection being broken a re-connection may be established using a coding scheme in which at least some bits specified in said predefined message format are represented by a plurality of bits transmitted;
 wherein said coding scheme comprises a respective fixed sequence of chips to represent each data bit; and
 the first and second devices are arranged to agree said coding scheme during the connection or during establishment of the connection;
 wherein said first device is arranged to send a message comprising capability information and information indicating coding gain or data rate to apply when attempting to re-establish communication; and
 said second device is arranged to send an acknowledgment to said first device confirming that said second device can support the requested coding gain or data rate.

16. A digital radio communication system comprising a first device and a second device, each comprising a radio transmitter and a radio receiver, wherein:
 a) said first and second devices are arranged to establish a connection using a predetermined protocol having at least one predefined message format; and
 b) said first and second devices are arranged to agree that in the event of said connection being broken a re-connection may be established using a coding scheme in which at least some bits specified in said predefined message format are represented by a plurality of bits transmitted;
 wherein said coding scheme comprises a respective fixed sequence of chips to represent each data bit; and
 the first and second devices are arranged to agree said coding scheme during the connection or during establishment of the connection;
 wherein said first device is arranged to send a message comprising capability information and information indicating coding gain or data rate to apply when attempting to re-establish communication; and said second device is arranged to send an acknowledgment to said first device confirming that said second device can support the requested coding gain or data rate.

17. A digital radio communication system as claimed in claim 16 wherein one or both of said first and second devices are arranged:
   a) to establish a connection with a second digital radio device using a predetermined protocol having at least one predefined message format; and
   b) to agree with said second device that in the event of said connection being broken a re-connection may be established using a coding scheme in which at least some bits specified in said predefined message format are represented by a plurality of bits transmitted.

18. A method of digital radio communication between a first device and a second device, each comprising a radio transmitter and a radio receiver, the method comprising:
   a) said first and second devices establishing a connection using a predetermined protocol; and
   b) if said connection is broken, one of said first and second devices transmitting an advertising message having a predefined message format indicating a desire to establish a re-connection wherein said advertising message is at least partly encoded using a coding scheme in which at least some bits specified in said predefined message format are represented by a plurality of bits transmitted;
   wherein said coding scheme comprises a respective fixed sequence of chips to represent each data bit; and
   the method further comprises the first and second devices agreeing said coding scheme during the connection or during establishment of the connection;
   said first device sending a message comprising capability information and information indicating coding gain or data rate to apply when attempting to re-establish communication; and
   said second device sending an acknowledgment to said first device confirming that said second device can support the requested coding gain or data rate.

19. A method as claimed in claim 18 wherein the first device comprises a master device and the second device comprises a slave device.

20. A method as claimed in claim 18 comprising the first and second devices agreeing to apply the coding scheme during a negotiation phase after an initial pairing.

21. A method as claimed in claim 18 comprising the first and second devices agreeing to apply the coding scheme to said advertising message during a Bonding phase after a Pairing phase in accordance with a Bluetooth™ or Bluetooth Low Energy™ protocol.

22. A method as claimed in claim 18 wherein the second device is arranged to listen for said advertising message if said connection is broken.

23. A method as claimed in claim 18 comprising the first and second devices establishing a re-connection using said coding scheme.

24. A method as claimed in claim 23 comprising using the coding scheme for subsequent communication packets after the re-connection has been established.

25. A method as claimed in claim 24 comprising changing the coding scheme if the received signal strength of one device is determined to be above or below a threshold level.

26. A method as claimed in claim 23 comprising changing the coding scheme if a criterion is met.

27. A method as claimed in claim 26 wherein said criterion comprises a measure of a quality of signal between the first and second devices.

28. A method as claimed in claim 26 wherein said criterion comprises an estimate of the received signal strength from one of the devices to the other device.

29. A method as claimed in claim 18 wherein the predetermined protocol is compatible with a Bluetooth™ or Bluetooth Low Energy™ protocol.

30. A digital radio device comprising a radio transmitter and a radio receiver, the device being arranged:
   a) to establish, using said radio transmitter and radio receiver, a connection with another digital radio device using a predetermined protocol; and
   b) if said connection is broken, to transmit, using said radio transmitter, an advertising message having a predefined message format indicating a desire to establish a re-connection wherein said advertising message is at least partly encoded using a coding scheme in which at least some bits specified in said predefined message format are represented by a plurality of bits transmitted;
   wherein said coding scheme comprises a respective fixed sequence of chips to represent each data bit; and
   the device is arranged to agree said coding scheme with the other device during the connection or during establishment of the connection; wherein
      said device is arranged to send a message comprising capability information and information indicating coding gain or data rate to apply when attempting to re-establish communication; and
      said other device is arranged to send an acknowledgment to said device confirming that said other device can support the requested coding gain or data rate.

31. A device as claimed in claim 30 arranged to agree said coding scheme with the other device during a negotiation phase after an initial pairing.

32. A device as claimed in claim 30 arranged to agree with the other device to apply the coding scheme during a Bonding phase after a Pairing phase in accordance with a Bluetooth™ or Bluetooth Low Energy™ protocol.

33. A device as claimed in claim 30 arranged to use the coding scheme for subsequent communication packets after a re-connection has been established.

34. A device as claimed in claim 33 arranged to change the coding scheme if a criterion is met.

35. A device as claimed in claim 34 wherein said criterion comprises a measure of a quality of signal from the other device.

36. A device as claimed in claim 34 wherein said criterion comprises an estimate of the received signal strength from one of the devices to the other device.

37. A device as claimed in claim 33 arranged to change the coding scheme if the received signal strength from the other device is determined to be above or below a threshold level.

38. A digital radio device comprising a radio transmitter and a radio receiver, the device being arranged:
   a) to establish, using said radio transmitter and radio receiver, a connection with another digital radio device using a predetermined protocol; and
   b) if said connection is broken, to listen, using said radio receiver, for an advertising message having a predefined message format indicating a desire to establish a re-connection wherein said advertising message is at least partly encoded using a coding scheme in which at least some bits specified in said predefined message format are represented by a plurality of bits transmitted;

wherein said coding scheme comprises a respective fixed sequence of chips to represent each data bit; and the device is arranged to agree said coding scheme with the other device during the connection or during establishment of the connection; wherein said device is arranged to send a message comprising capability information and information indicating coding gain or data rate to apply when attempting to re-establish communication; and said other device is arranged to send an acknowledgment to said device confirming that said other device can support the requested coding gain or data rate.

39. A device as claimed in claim 38 wherein the predetermined protocol is compatible with a Bluetooth™ protocol.

40. A digital radio communication system comprising a first device and a second device, each comprising a radio transmitter and a radio receiver, wherein:

a) said first and second devices are arranged to establish a connection using a predetermined protocol; and b) if said connection is broken, one of said first and second devices is arranged to transmit an advertising message having a predefined message format indicating a desire to establish a re-connection wherein said advertising message is at least partly encoded using a coding scheme in which at least some bits specified in said predefined message format are represented by a plurality of bits transmitted;

wherein said coding scheme comprises a respective fixed sequence of chips to represent each data bit; and the first and second devices are arranged to agree said coding scheme during the connection or during establishment of the connection; wherein said device is arranged to send a message comprising capability information and information indicating coding gain or data rate to apply when attempting to re-establish communication; and said other device is arranged to send an acknowledgment to said device confirming that said other device can support the requested coding gain or data rate.

41. A digital radio communication system as claimed in claim 40 wherein one or both of said first and second devices are arranged:

a) to establish a connection with another digital radio device using a predetermined protocol; and b) if said connection is broken, to transmit an advertising message having a predefined message format indicating a desire to establish a re-connection wherein said advertising message is at least partly encoded using a coding scheme in which at least some bits specified in said predefined message format are represented by a plurality of bits transmitted.

\* \* \* \* \*